June 25, 1935.  D. BROWN  2,005,886

METHOD OF AND APPARATUS FOR MOLDING CLAY BODIES

Filed Jan. 18, 1932   2 Sheets-Sheet 1

Inventor
Davis Brown
By Lyon & Lyon
Attorneys

June 25, 1935.  D. BROWN  2,005,886
METHOD OF AND APPARATUS FOR MOLDING CLAY BODIES
Filed Jan. 18, 1932  2 Sheets-Sheet 2
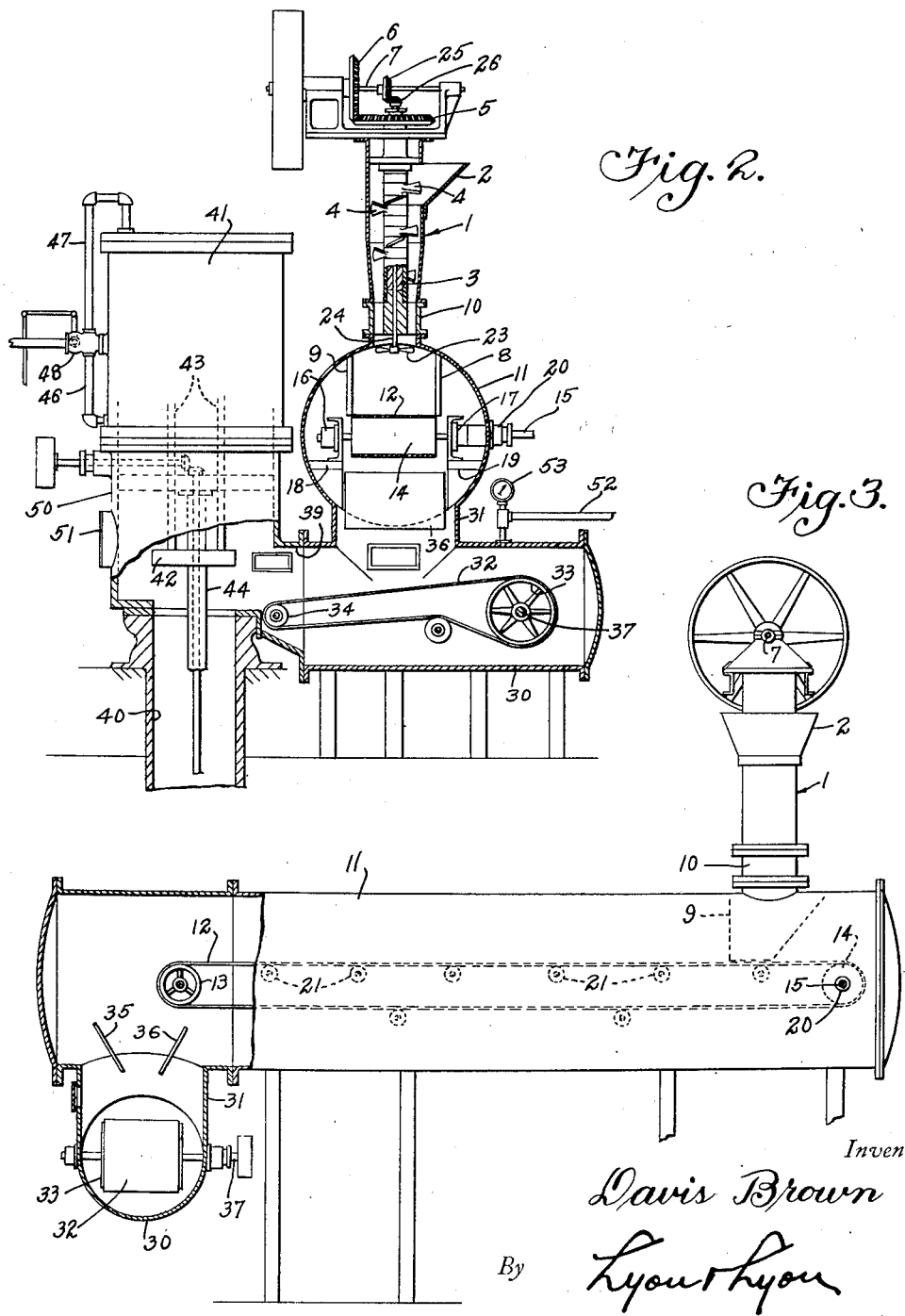

Patented June 25, 1935

2,005,886

UNITED STATES PATENT OFFICE 2,005,886

METHOD OF AND APPARATUS FOR MOLDING CLAY BODIES

Davis Brown, Los Angeles, Calif.

Application January 18, 1932, Serial No. 587,195

18 Claims. (Cl. 25—15)

This invention relates to a method of molding bodies from clay compositions and is particularly directed toward a method of molding by extrusion through a suitable die. The invention also relates to an apparatus eminently suited for use in carrying out the method.

For purposes of simplicity, the subsequent description of the invention will be limited to the use of the method and to an apparatus adapted to the formation of bodies from plastic clay compositions, although it is to be understood that the method and apparatus of this invention may be utilized on numerous other plastic compositions. By "clay" as used herein, reference is made not only to a single clay but also to plastic clay compositions containing a blend of clay-like silicates, either alone or together with other material such as grog, filler, cementitious materials such as Portland cement, etc.

In the manufacture of clay bodies in the ceramic industry, the clay composition is normally prepared by grinding the clays or other materials which are to be a part of the finished compositions, pugging the ingredients with water so as to produce a plastic mass, and then molding the desired shapes from said mass. The molding operation may be carried out in a number of different ways. This invention is primarily directed toward a method of molding by extrusion through a die. By such extrusion process, the clay may be formed into long strips of clay which may then be cut into suitable lengths so as to form conduits, hollow tile, pipe, etc.

More specifically, the invention is directed to a method and apparatus in which the clay mass is extruded by the application of direct pressure to the clay mass in a direction in alignment with or paralleling the flow of clay through the die. The simplest embodiment of apparatus adapted to so place clay under pressure is a clay cylinder having a die at one end and a piston at the other, the piston being adapted to force clay present in the cylinder through the die. This mode of extrusion is to be distinguished from that in which an auger type of machine is employed. Auger types of extrusion machine are well known in the art but it has been found that although the clay may be advanced by means of an auger, the extruded bodies exhibit laminations and what may be called cleavage planes. In an auger machine, the clay mass is cut up into a series of spirally arranged ropes and a considerable amount of slippage occurs between the clay and the helically arranged vanes of the auger. This slippage polishes or slicks the surfaces of the clay ropes so that when the clay ropes are finally extruded through the die in substantial contact with each other, the bond between adjoining ropes is not as perfect as the bond between the individual clay particles in each rope. For this reason, clay bodies formed by extrusion on an auger type of machine are not as homogeneous nor as strong as bodies made in accordance with this invention where the pressure is applied directly to a mass of clay and the entire mass forced out through a die Furthermore, clay compositions after being pugged, contain an appreciable amount of occluded or entrapped air. In the preliminary grinding of the clay, the particles are finely subdivided and each of the particles absorbs or adsorbs a certain amount of air. During the pugging operation, some of the air is displaced and the particles of clay hydrate and come in contact with each other, thereby imparting plasticity to the clay mass. Relatively large amounts of air, however, still remain in the clay mass and during an ordinary extrusion process, inequalities and blisters form in the finished product due to the air present in the clay mass. Furthermore, the clay masses ordinarily molded exhibit an appreciable porosity, this porosity being largely due to the air present in the plastic clay mass.

It is an object of this invention to disclose and provide a method of molding bodies from plastic clay compositions whereby bodies of much greater density may be obtained than is normally the case.

Another object of the invention is to disclose and provide a method of treating clay compositions whereby they are rendered much more plastic, homogeneous and dense.

A still further object of this invention is to disclose and provide a method of molding extremely dense, impervious, strong, tough and coherent bodies from clay compositions.

An object of this invention is to disclose and provide an apparatus for treating clay compositions and for molding bodies therefrom.

Another object is to disclose and provide an apparatus capable of extracting occluded and entrapped air from clay compositions whereby dense, tough and homogeneous bodies may be produced therefrom.

A still further object is to disclose and provide a combination of elements whereby clay bodies of great tenacity may be made.

These and other objects, uses and advantages of the inventions embraced herein will become apparent to those skilled in the art from the subsequent detailed description of a preferred form of apparatus adapted to carry out the method of this invention.

In describing the invention, reference will be had to the appended drawings, in which Fig. 1 is a side elevation, partially in section, of a clay treating and extrusion machine made in accordance with this invention.

Fig. 2 is an enlarged elevation, partially in section, of a portion of the machine shown in Fig. 1.

Fig. 3 is an end view, partially in section, of the machine illustrated in Figs. 1 and 2.

Figure 1:
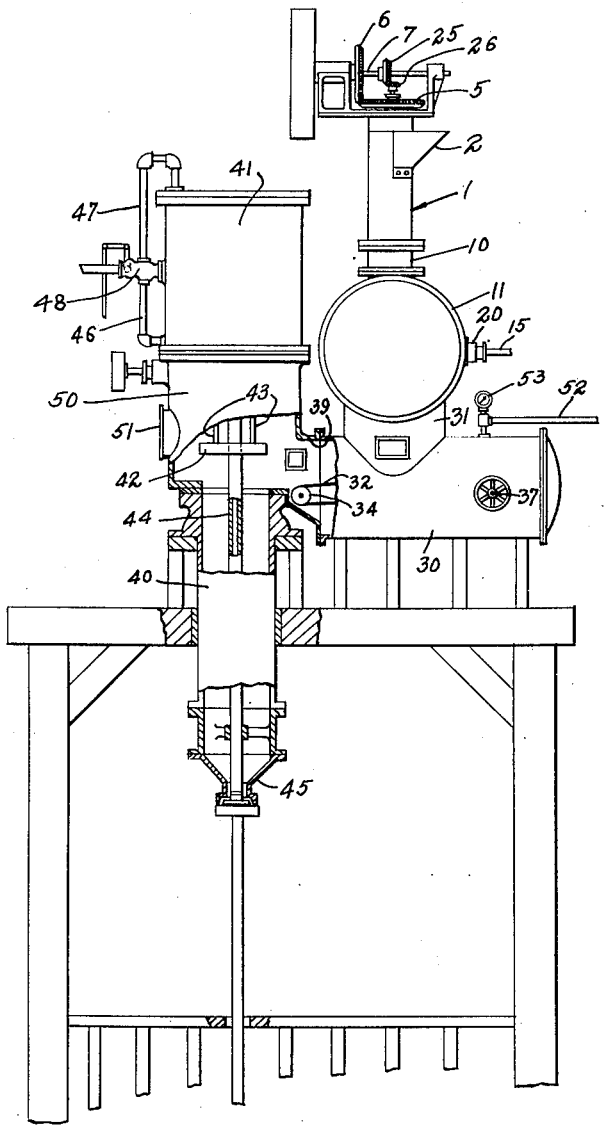

As shown in the drawings, the previously pugged clay may be introduced into the vertical auger 1 through a hopper 2. The auger 1 may include a centrally disposed stem 3 around which the auger knives 4 are rotatably driven, the knives being inclined so as to advance the clay downwardly. The auger knives 4 may be driven in any suitable manner as, for example, by means of a gear 5 and a miter gear 6 mounted upon a driving shaft 7. The lower end of the auger 1 may be provided with any suitable die 10 such as, for example, a die ordinarily employed in making hollow tile.

The clay is advanced by the auger into a feeding chamber composed of an elongated housing 11. The housing 11 is preferably provided with an endless conveyor 12 suitably mounted on driving rollers 13 and 14. The shaft 15 on which the roller 14 is mounted, may be supported in suitable bearings 16 and 17 carried by brackets 18 and 19 respectively within the housing 11. The shaft 15 preferably extends through a suitable gasket 20 in the wall of the housing 11 and is driven by any suitable means, not shown in the drawings. A plurality of idler rollers 21 support the endless conveyor 12 between the rollers 13 and 14. The conveyor 12 may be made of any suitable material although it has been found that a foraminous conveyor as, for example, one made of wire netting, has been found to be particularly suitable.

The clay extruded through the die 10 by the auger 1 is preferably cut up into small pieces as by means of a revolving knife 23 mounted upon a shaft 24, provided with a suitable packing gland extending through the hollow stem 3 and journaled in and extending through the die 10. The shaft 24 may be driven by the shaft 7 through suitable miter gears 25 and 26. Preferably, the shaft 24 is driven at a higher rate of speed than the auger itself.

The small pieces of clay may be directed onto the endless conveyor 12 by means of suitable guide plates 8 and 9 extending from the inlet port to the conveyor 12.

The housing 11 is preferably provided with an outlet port in communication with another housing 30. As shown in the drawings, the housing 30 is at right angles to the housing 11 and the housings 30 and 11 are connected together by means of a neck 31. Means for discharging clay periodically from housing 30 are provided. For example, a flying conveyor 32 is positioned within the housing 30 on suitable pulleys 33 and 34. Guide plates 35 and 36 are positioned near the outlet of the housing 11 and between the discharge point of the conveyor 12 and the flying conveyor 32 so as to direct clay from the conveyor 12 onto the conveyor 32. The conveyor 32 may be driven in any suitable manner, the driven roller on which the conveyor is mounted being keyed to a shaft, such as the shaft 37 extending through the housing 30. The driving means are suitably synchronized with the movement of the plunger 42 of the molding machine, as will later appear.

The flying conveyor 32 is adapted to discharge clay periodically into a clay cylinder 40 provided with a head 50, said clay cylinder 40 being in axial alignment with a pressure fluid or steam cylinder 41. The pressure fluid cylinder 41 is provided with a piston operatively connected to a clay piston or plunger 42 by means of piston rods 43. The clay piston 42 may be slidably carried by a hollow stem 44 extending through the clay cylinder 40 into the die 45 attached to the bottom of the clay cylinder. The hollow stem 44 may act as the core in the die 45 when cylindrical objects such as pipe, are being manufactured. The pressure cylinder 41 is provided with suitable pressure fluid lines 46 and 47 and control valves 48 by means of which the clay piston 42 may be caused to reciprocatingly move into and out of the clay cylinder and space between the clay cylinder 40 and pressure cylinder 41. The head 50 may be provided with a window 51 and is operatively connected with the housing 30 by a port 39. The clay feeder or flying conveyor 32 is adapted to discharge clay into the clay cylinder 40 and head 50, through the port 39 in timed relation to the reciprocating movement of the plunger 42, as when the piston 42 is in raised position, as shown in Fig. 1. The levers for actuating valve 48 may be suitably interlocked with the means for actuating the conveyor 32 so as to obtain the timed operation of the conveyor 32 and plunger 42.

It is to be understood that the housings 11 and 30 and the head 50 are made with substantially gas-tight joints; the clay mass being forced downwardly through the die 10 by the auger 1 packs solidly in the die 10 and acts as a seal. Clay in the clay cylinder 40 is pressed downwardly through the die 45 and packs in such die, acting as a seal at that point. Suction is then applied to the apparatus at any desired point as, for example, to the housing 30 by means of suction line 52 provided with a vacuum gage 53. The entire system, including housing 11, housing 30, head 50 and clay cylinder 40, is thus placed under a vacuum.

In operation, the pugged mass of clay composition is placed in the hopper 2 and advanced by the auger 1 through a suitable die 10. The stream or streams of clay extruded through the die 10 are cut into short pieces by the knife 23 and the pieces of clay fall upon the endless conveyor 12 which supports and slowly moves the clay toward the outlet. While the pieces of clay are thus distributed over the surface of the conveyor 12, they are exposed to reduced air pressure within the housing 11 and air contained in the clay is thus extracted therefrom. No mechanical pressure is exerted on the moist clay particles.

Preferably, the apparatus is operated under a vacuum of 21 to 28 inches of mercury. The rate at which the clay is fed into the housing 11 by the auger 1 and the speed of the conveyor 12 within the housing 11 are so regulated that the clay particles are exposed to the action of vacuum for a length of time sufficient to extract or remove therefrom substantially all of the air carried thereby.

It has been found, for example, that with very plastic clays it is necessary to maintain the clay particles within the housings 11 and 30 for as long as 5 to 10 minutes. The length of time required to remove substantially all of the entrained air will depend, of course, upon the degree of vacuum carried in the apparatus, the fineness of subdivision of the clay and the inherent plasticity of the clay. The conveyor 12 (operated continuously or periodically) discharges the clay particles upon the flying conveyor 32. The operation of the flying conveyor 32 is synchronized with the operation of the clay piston 42 so that every time the clay piston 42 is raised out of the clay cylinder 40 into the head 50, the flying conveyor 32 quickly advances and deposits a suitable charge or body of clay in the clay cylinder 40. Instead of employing a continuous conveyor 32, any intermittently operating means for supplying clay to the clay cylinder 40 may be used. The intermittent feeder 32 thus acts as a temporary storage for the clay and materially speeds up the operation. Furthermore, it absorbs any inequalities in the operation of the main conveyor 12.

The charge or body of clay in the clay cylinder is then compressed by the downward motion of the clay piston 42 and the downward pressure exerted on the clay while under vacuum compacts the clay to form a clay mass which is extremely dense. This dense clay mass, substantially free from occluded air, is then discharged through the die 45 in any desired form.

It has been found that molded articles or shapes prepared from clay treated in the apparatus described hereinabove, are extremely strong even in the green state and are substantially free from blisters caused by air ordinarily trapped in the clay. Furthermore, the removal of the air from the clay mass appears to increase the plasticity of the clay, the clay particles being in actual contact with each other. Ceramic articles resulting from a molding operation of the character stated, may be produced with lower breakage loss than has ever been heretofore possible.

It is to be noted that in the above apparatus, the clay is exposed to subatmospheric pressure in a comminuted or divided condition, thereby exposing a considerable surface to the action of the vacuum existing in the housings 11 and 30. The form of the die 10 through which the clay is admitted into the housing 11 may be varied so as to insure the presence of large surface area on the particles of clay carried by the conveyor 12.

As the molding operation or compacting of the clay in the cylinder 40 takes place in a vacuum, there is no possibility of the plunger 42 trapping and compressing air in the cylinder 40. Substantially all of the power used in moving the plunger 42 is exerted in compacting the clay.

Numerous changes and modifications of the apparatus disclosed hereinbefore will occur to those skilled in the art. All such changes and modifications as come within the scope of the appended claims are embraced thereby.

I claim:

1. In a machine for extruding clay bodies under pressure, the combination of a clay cylinder provided with a head at one end and a die at the other, a clay plunger reciprocatingly mounted in the cylinder, means for moving the clay plunger into and out of the clay cylinder and head, a lateral port in said head at a point substantially between the clay cylinder and plunger when said plunger is in raised position, a substantially air-tight housing in operative communication with said lateral port, means for introducing clay into the housing, means for moving clay in loose form through the housing toward said lateral port, and means for maintaining said housing, head and cylinder at a subatmospheric pressure.

2. In a machine for extruding clay bodies under pressure, the combination of a clay cylinder provided with a head at one end and a die at the other, a clay plunger reciprocatingly mounted in the cylinder, means for moving the clay plunger into and out of the clay cylinder and head, a lateral port in said head at a point substantially between the clay cylinder and plunger when said plunger is in raised position; and a clay treating and feeding means in operative relation to said port, said clay treating and feeding means comprising an elongated substantially horizontal housing provided with an inlet near one end and an outlet at the other, the outlet port of said housing being in operative substantially air-tight communication with the lateral port in said head, a conveyor in said housing and adapted to carry comminuted clay from said inlet to said clay cylinder through said outlet, and means for maintaining said clay treating and feeding means, head and clay cylinder at a subatmospheric pressure.

3. In a machine for extruding clay bodies under pressure, the combination of a clay cylinder provided with a head at one end and a die at the other, a clay plunger reciprocatingly mounted in the cylinder, means for moving the clay plunger into and out of the clay cylinder and head, a lateral port in said head at a point substantially between the clay cylinder and plunger when said plunger is in raised position; and a clay treating and feeding means in operative relation to said port, said clay treating and feeding means comprising an elongated substantially horizontal housing provided with an inlet at one end and an outlet at the other, the outlet port of said housing being in operative substantially air-tight communication with the lateral port in said head, a continuous conveyor operably mounted in said housing and adapted to carry comminuted clay from said inlet to said outlet, means for receiving clay from said conveyor and periodically discharging the clay through said lateral port into said head and clay cylinder in timed relation to the movement of the plunger, and means for maintaining said clay treating and feeding means, head and clay cylinder at a subatmospheric pressure.

4. In a machine for extruding clay bodies under pressure, the combination of a clay cylinder provided with a head at one end and a die at the other, a clay plunger reciprocatingly mounted in the cylinder, means for moving the clay plunger into and out of the clay cylinder and head, a lateral port in said head at a point substantially between the clay cylinder and plunger when said plunger is in raised position; and a clay treating and feeding means in operative relation to said port, said clay treating and feeding means comprising an elongated substantially horizontal housing provided with an inlet at one end and an outlet at the other, the outlet port of said housing being in operative substantially air-tight communication with the lateral port in said head, a continuous conveyor operably mounted in said housing and adapted to carry comminuted clay from said inlet to said outlet, a die mounted in said inlet port, means for forcing clay through said die into said housing, a cutting and communicating means adapted to comminute clay forced through said die, said cutting means being positioned between said die and conveyor, and means for maintaining said clay treating and feeding means, head and clay cylinder at a subatmospheric pressure.

5. In a machine for extruding clay bodies under pressure, the combination of a clay cylinder provided with a head at one end and a die at the other, a clay plunger reciprocatingly mounted in the cylinder, means for moving the clay plunger into and out of the clay cylinder and head, a lateral port in said head at a point substantially between the clay cylinder and plunger when said plunger is in raised position; and a clay treating and feeding means in operative relation to said port, said clay treating and feeding means comprising an elongated substantially horizontal housing provided with an inlet at one end and an outlet at the other, the outlet port of said housing being in operative substantially air-tight communication with the lateral port in said head, a continuous conveyor operably mounted in said housing and adapted to carry comminuted clay from said inlet to said outlet, a die mounted in said inlet port, means for forcing clay through said die into said housing, a cutting and communicating means adapted to comminute clay forced through said die, said cutting means being positioned between said die and conveyor, means for receiving clay from said conveyor and periodically discharging the clay through said lateral port into said head and clay cylinder in timed relation to the movement of the plunger, and means for maintaining said clay treating and feeding means, head and clay cylinder at a subatmospheric pressure.

6. In a machine for extruding clay bodies under pressure, the combination of a clay cylinder provided with a head at one end and a die at the other, a clay plunger reciprocatingly mounted in the cylinder, means for moving the clay plunger into and out of the clay cylinder and head, a lateral port in said head at a point substantially between the clay cylinder and plunger when said plunger is in raised position; and a clay treating and feeding means in operative relation to said port, said clay treating and feeding means comprising an elongated substantially horizontal housing provided with an inlet at one end and an outlet at the other, a continuous conveyor operably mounted in said housing and adapted to carry comminuted clay from said inlet to said outlet, an intermittently operating secondary conveyor adapted to receive clay from said continuous conveyor, means for periodically operating said secondary conveyor to discharge the clay through said lateral port into said head and clay cylinder in timed relation to the movement of the plunger, and means for maintaining said clay treating and feeding means, head and clay cylinder at a subatmospheric pressure.

7. In a method of molding clay articles, the steps of deaerating a moist clay mass by subjecting a comminuted clay mass to a vacuum of 21 to 28 inches of mercury for a sufficient length of time to remove therefrom substantially all entrapped and absorbed air without removing moisture therefrom, forming a body of said comminuted and deaerated moist clay, and subjecting the body to direct pressure without access of extraneous air to form molded articles therefrom which are substantially free from slippage planes.

8. A method of molding clay articles which comprises: passing a moist clay mass through a die under pressure to form a relatively dense clay mass; extending the surface area of the moist clay mass by comminuting the relatively dense clay; subjecting the comminuted clay to a subatmospheric pressure for a sufficient length of time to remove therefrom substantially all entrapped and absorbed air but not sufficient to remove moisture; forming a body of the comminuted and deaerated moist clay, and subjecting the body of comminuted clay to direct pressure to form molded articles therefrom free from slippage planes.

9. In a machine for extruding clay bodies under pressure, the combination of a clay cylinder provided with a head at one end and a die at the other, a clay plunger reciprocatingly mounted in the cylinder, means for moving the clay plunger into and out of the clay cylinder and head, a lateral port in said head at a point substantially between the clay cylinder and plunger when said plunger is in raised position; and a clay treating and feeding means in operative relation to said port, said clay treating and feeding means comprising an elongated substantially horizontal housing provided with an inlet at one end and an outlet at the other, the outlet port of said housing being in operative substantially air-tight communication with the lateral port in said head, means for supplying clay to the inlet of said housing, a conveyor operably mounted in said housing and adapted to carry comminuted clay from said inlet to said outlet, and means for maintaining said clay treating and feeding means, head and clay cylinder at a subatmospheric pressure.

10. A machine for forming clay pipe and the like embodying: a vertical die; an air tight die feed chamber mounted on the top of said die in internal communication therewith; means for delivering clay into said die feed chamber; and a reciprocating pressure head for forcing the clay from said die feed chamber through said die, said die being constructed so as to form a clay seal during the retraction of said pressure head.

11. A machine for forming clay pipe and the like embodying: a vertical die; an air tight press chamber mounted on top of said die in internal communication therewith; press means in said press chamber for forcing clay from said press chamber through said die; an air tight clay press feed conduit connected in air tight relation with said press chamber; means including a clay seal for delivering clay to said air tight press feed conduit; means for forcing clay from said press feed conduit into said press chamber; and means for evacuating the air from said press feed conduit.

12. A machine for forming clay pipe and the like, embodying: a vertical clay cylinder provided with an enclosed head and a die at the lower end, a clay plunger reciprocatingly mounted in said cylinder and adapted to move into and out of the clay cylinder and head to intermittently apply pressure axially of said cylinder upon clay in said cylinder to compact said clay in said die to form a seal; and a clay feeding and treating means in communication with the head of said cylinder and including a housing, a restricted port into said housing, means for continuously feeding moist clay through said port into said housing to form a compacted clay seal in said port, means for feeding clay from said housing toward said clay cylinder, and means for maintaining said housing and cylinder head at a subatmospheric pressure.

13. A machine for forming clay pipe and the like, comprising: a vertical clay cylinder provided with an enclosed head and a die at the lower end, a clay plunger reciprocatingly mounted in said cylinder and adapted to move into and out of the clay cylinder and head to intermittently apply pressure axially of said cylinder upon clay in said cylinder to compact said clay in said die to form a seal; and a clay feeding and treating means in communication with the head of said cylinder and including a housing, a restricted port into said housing, means for continuously feeding moist clay through said port into said housing to form a compacted clay seal in said port, means for intermittently feeding clay from said housing toward said clay cylinder, and means for maintaining said housing and cylinder head at a subatmospheric pressure.

14. A machine for forming clay pipe and the like, comprising: a vertical clay cylinder provided with an enclosed head and a die at the lower end, a clay plunger reciprocatingly mounted in said cylinder and adapted to move into and out of the clay cylinder and head to intermittently apply pressure axially of said cylinder upon clay in said cylinder to compact said clay in said die to form a seal; and a clay feeding and treating means in communication with the head of said cylinder and including a housing, a restricted port into said housing, means for continuously feeding moist clay through said port into said housing to form a compacted clay seal in said port, means for comminuting compacted clay fed into said housing through said port, means for intermittently feeding clay from and housing toward said clay cylinder, and means for maintaining said housing and cylinder head at a subatmospheric pressure.

15. A machine for forming clay pipe and the like, embodying: a vertical clay cylinder provided with an enclosed head at the upper end and a forming die at the lower end, a clay plunger reciprocatingly mounted in said cylinder and adapted to move into and out of the clay cylinder and head to intermittently apply pressure axially of said cylinder upon clay in said cylinder to compact clay in the lower portion of said cylinder and force the same through said forming die, means for feeding clay through a restricted opening in which said clay is compacted to form a seal, said clay feeding means being operably connected to said cylinder head, and means for maintaining said cylinder head and clay fed through said restricted opening at a subatmospheric pressure.

16. A method of molding clay bodies comprising: continuously passing moist clay through a restricted opening to compact the same and to form a clay seal therein, breaking up and comminuting the compacted clay discharged through said restricted opening, passing said comminuted clay into a compacting zone, intermittently subjecting the clay in said compacting zone to pressure applied axially of said compacting zone to form a clay seal at one end of said zone, and subjecting the comminuted clay at points between said clay seals to subatmospheric pressure.

17. A method of molding clay bodies comprising: continuously passing moist clay through a restricted opening to compact the same and to form a clay seal therein, breaking up and comminuting the compacted clay discharged through said restricted opening, intermittently passing said comminuted clay into a compacting zone, intermittently subjecting the clay in said compacting zone to direct pressure applied longitudinally of said compacting zone to form a clay seal at one end of said zone, and subjecting the comminuted clay at points between said clay seals to subatmospheric pressure.

18. A machine for forming clay pipe and the like comprising: a vertical die; an air tight die feed chamber mounted on the top of said die in internal communication therewith; reciprocating press means in said die feed chamber for forcing clay from said chamber through said die; an air tight feed conduit connected in air tight relation with said die feed chamber; means including a clay seal for delivering clay to said air tight feed conduit, means for forcing clay from said feed conduit into said die feed chamber, and means for evacuating the air from said conduit.

DAVIS BROWN.